United States Patent
Ando et al.

(10) Patent No.: US 12,168,707 B2
(45) Date of Patent: Dec. 17, 2024

(54) WATER REPELLENT OIL REPELLENT AGENT FOR FIBERS AND FIBER PRODUCT

(71) Applicants: NATIONAL UNIVERSITY CORPORATION NARA INSTITUTE OF SCIENCE AND TECHNOLOGY, Ikoma (JP); DAIKIN INDUSTRIES, LTD., Osaka (JP)

(72) Inventors: Tsuyoshi Ando, Ikoma (JP); Kayo Terada, Ikoma (JP); Nobuo Murase, Ikoma (JP); Shota Shibutani, Osaka (JP); Yoshito Tanaka, Osaka (JP); Takuma Kawabe, Osaka (JP); Ikuo Yamamoto, Osaka (JP)

(73) Assignees: NATIONAL UNIVERSITY CORPORATION NARA INSTITUTE OF SCIENCE AND TECHNOLOGY, Ikoma (JP); DAIKIN INDUSTRIES, LTD., Osaka (JP)

( * ) Notice: Subject to any disclaimer, the term of this patent is extended or adjusted under 35 U.S.C. 154(b) by 917 days.

(21) Appl. No.: 17/269,608

(22) PCT Filed: Aug. 27, 2019

(86) PCT No.: PCT/JP2019/033468
§ 371 (c)(1),
(2) Date: Feb. 19, 2021

(87) PCT Pub. No.: WO2020/045407
PCT Pub. Date: Mar. 5, 2020

(65) Prior Publication Data
US 2021/0317246 A1  Oct. 14, 2021

(30) Foreign Application Priority Data
Aug. 28, 2018  (JP) .................... 2018-159265

(51) Int. Cl.
*C08F 265/02* (2006.01)
*C08F 255/02* (2006.01)
*C08F 265/06* (2006.01)
*C09K 3/18* (2006.01)
*D01F 11/08* (2006.01)

(52) U.S. Cl.
CPC ........ *C08F 255/026* (2013.01); *C08F 265/06* (2013.01); *C09K 3/18* (2013.01); *D01F 11/08* (2013.01); *D10B 2331/04* (2013.01); *D10B 2401/021* (2013.01)

(58) Field of Classification Search
CPC ...... C08F 255/026; C08F 265/06; C09K 3/18; D01F 11/08; D10B 2331/04; D10B 2401/021
See application file for complete search history.

(56) References Cited

U.S. PATENT DOCUMENTS

| | | | | |
|---|---|---|---|---|
| 2008/0221224 A1* | 9/2008 | Sheiko | ..................... | C08F 20/56 514/789 |
| 2011/0305898 A1* | 12/2011 | Zhang | ................... | B32B 27/365 427/2.24 |
| 2015/0057590 A1* | 2/2015 | Reilly | ................... | A61F 11/202 604/8 |
| 2016/0108577 A1* | 4/2016 | Gulati | ................. | D06M 15/568 8/116.1 |
| 2020/0385496 A1 | 12/2020 | Shimanaka et al. | | |

FOREIGN PATENT DOCUMENTS

JP  6245719 B1  12/2017

OTHER PUBLICATIONS

International Preliminary Report on Patentability dated Mar. 2, 2021 with translation of the Written Opinion from the International Bureau in International Application No. PCT/JP2019/033468.
Extended European Search Report dated Jun. 15, 2022, issued in European Application No. 19854817.4.
International Search Report for PCT/JP2019/033468 dated Nov. 26, 2019 [PCT/ISA/210].

* cited by examiner

*Primary Examiner* — Amina S Khan
(74) *Attorney, Agent, or Firm* — Sughrue Mion, PLLC

(57) ABSTRACT

A water- and oil-repellent agent for fibers containing a bottle brush polymer having a structure represented by the following formula (1), wherein $R^1$ is H or $CH_3$; $R^2$ is a divalent organic group; $R^3$ is a polymer chain having a structure represented by the following formula (2) (wherein $R^4$ is H or $CH_3$; $R^5$ is a C16-C40 monovalent hydrocarbon group; and n is an integer of 10 to 1000); and m is an integer of 10 to 5000:

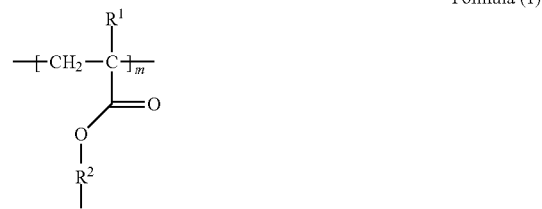

Formula (1)

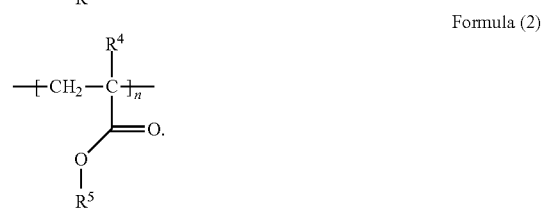

Formula (2)

8 Claims, No Drawings

WATER REPELLENT OIL REPELLENT AGENT FOR FIBERS AND FIBER PRODUCT

CROSS REFERENCE TO RELATED APPLICATIONS

This application is a National Stage of International Application No. PCT/JP2019/033468 filed Aug. 27, 2019, claiming priority based on Japanese Patent Application No. 2018-159265 filed Aug. 28, 2018.

TECHNICAL FIELD

The disclosure relates to water- and oil-repellent agents for fibers and fiber products.

BACKGROUND ART

In order to give water-repellency or oil-repellency to fiber products, water-repellent agents or oil-repellent agents are widely used to treat surfaces of fiber products. In conventional cases, fluorine-based water-repellent agents and oil-repellent agents are widely used.

Polymers examined in other fields have a complex structure, such as graft copolymers, hyperbranched polymers, and star polymers (for example, see Patent Literature 1).

CITATION LIST

Patent Literature

Patent Literature 1: JP 6245719 B

SUMMARY OF INVENTION

Technical Problem

The disclosure aims to provide a novel water- and oil-repellent agent for fibers and a fiber product.

Solution to Problem

The disclosure relates to a water- and oil-repellent agent for fibers containing a bottle brush polymer having a structure represented by the following formula (1):

[Chem. 1]

$$-\!\!\left(\!CH_2-\!\!\underset{\underset{\underset{R^3}{|}}{\overset{|}{R^2}}}{\overset{R^1}{\overset{|}{C}}}\!\!\right)_{\!\!m}\!\!=\!O$$

wherein
$R^1$ is H or $CH_3$;
$R^2$ is a divalent organic group;
$R^3$ is a polymer chain having a structure represented by the following formula (2):

[Chem. 2]

$$-\!\!\left(\!CH_2-\!\!\underset{\underset{R^5}{\overset{|}{O}}}{\overset{R^4}{\overset{|}{C}}}\!\!\right)_{\!\!n}\!\!=\!O$$

wherein $R^4$ is H or $CH_3$; $R^5$ is a C16-C40 monovalent hydrocarbon group; and n is an integer of 10 to 1000; and m is an integer of 10 to 5000.

The bottle brush polymer preferably has a number average molecular weight determined by gel permeation chromatography (GPC) of 5000 to 2000000.

The bottle brush polymer preferably has a molecular weight distribution determined by gel permeation chromatography (GPC) of 1.0 to 5.0.

The bottle brush polymer preferably contains halogen atoms in a total amount of 0.01 to 30% by mass.

The bottle brush polymer preferably contains bromine atoms, chlorine atoms, and iodine atoms in a total amount of 0.01 to 30% by mass.

$R^5$ is preferably a C16-C24 monovalent hydrocarbon group.

$R^2$ is preferably a group represented by the following formula (a):

$$-(CH_2)_p-O-C(=O)-R^6- \quad (a)$$

wherein $R^6$ is a C1-C3 alkylene group; and p is an integer of 1 to 10.

The bottle brush polymer preferably contains no fluorine atom.

The disclosure also relates to a fiber product containing fibers coated with the water- and oil-repellent agent for fibers.

Advantageous Effects of Invention

The disclosure can provide a novel water- and oil-repellent agent for fibers and a fiber product.

DESCRIPTION OF EMBODIMENTS

The disclosure is described in detail below.

The disclosure relates to a water- and oil-repellent agent for fibers containing a bottle brush polymer having a structure represented by the following formula (1):

[Chem. 3]

$$-\!\!\left(\!CH_2-\!\!\underset{\underset{\underset{R^3}{|}}{\overset{|}{R^2}}}{\overset{R^1}{\overset{|}{C}}}\!\!\right)_{\!\!m}\!\!=\!O$$

wherein
$R^1$ is H or $CH_3$;
$R^2$ is a divalent organic group;

$R^3$ is a polymer chain having a structure represented by the following formula (2):

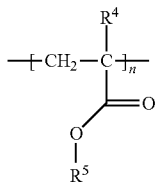

[Chem. 4]

wherein $R^4$ is H or $CH_3$; $R^5$ is a C16-C40 monovalent hydrocarbon group; and n is an integer of 10 to 1000; and m is an integer of 10 to 5000.

The inventors first found that a bottle brush polymer having the above structure has excellent water- and oil-repellency, and further found that the bottle brush polymer of interest is particularly suitable for water- and oil-repellent agents for fibers. Thereby, the inventors completed the water- and oil-repellent agent for fibers of the disclosure (hereinafter, also referred to as the water- and oil-repellent agent of the disclosure).

The bottle brush polymer constituting the water- and oil-repellent agent of the disclosure is represented by the following formula (1).

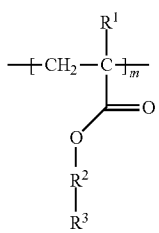

[Chem. 5]

In the formula (1), $R^1$ is H or $CH_3$. $R^1$ is preferably $CH_3$.

In the formula (1), $R^2$ is a divalent organic group. The divalent organic group means a divalent group containing one or more carbon atoms or a divalent group obtainable by removing two hydrogen atoms from an organic compound. The organic group for $R^2$ may contain any of an oxygen atom, a nitrogen atom, a sulfur atom, a halogen atom, and the like at a position other than the ends.

The organic group preferably has a carbon number of 1 or greater, more preferably 2 or greater, still more preferably 3 or greater, while preferably 20 or smaller, more preferably 15 or smaller, still more preferably 10 or smaller.

$R^2$ is preferably a group represented by the following formula (a):

wherein $R^6$ is a C1-C3 alkylene group; and p is an integer of 1 to 10.

In this case, $R^6$ binds to $R^3$ in the formula (1).

In the formula (a), $R^6$ is a C1-C3 alkylene group. Examples of the alkylene group include $-CH_2-$, $-CH_2CH_2-$, $-CH_2CH_2CH_2-$, $-CH(CH_3)-$, $-CH(CH_3)CH_2-$, and $-C(CH_3)_2-$. Preferred among these is $-C(CH_3)_2-$.

In the formula (a), p is an integer of 1 to 10, preferably an integer of 1 to 5, more preferably an integer of 1 to 4.

In the formula (1), $R^3$ is a polymer chain having a structure represented by the following formula (2).

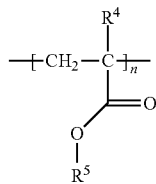

[Chem. 6]

In the formula (2), $R^4$ is H or $CH_3$.

In the formula (2), $R^5$ is a C16-C40 monovalent hydrocarbon group. The bottle brush polymer in which the hydrocarbon group for $R^5$ has a carbon number within the above range can exhibit significantly excellent water- and oil-repellency.

The carbon number of the hydrocarbon group is preferably 16 to 30, more preferably 16 to 24, still more preferably 16 to 22, particularly preferably 18 to 22.

$R^5$ is preferably a linear or branched alkyl group having a carbon number within the aforementioned range, particularly preferably a stearyl group, an eicosyl group, or a behenyl group.

In the formula (2), n is an integer of 10 to 1000, preferably an integer of 10 to 500, more preferably an integer of 20 to 200, still more preferably an integer of 20 to 100.

In the formula (1), m is an integer of 10 to 5000, preferably an integer of 20 to 1000, more preferably an integer of 30 to 500, still more preferably an integer of 40 to 300.

$R^3$ may further contain a polymerized unit based on a curable functional group-containing monomer. Specific examples of the curable functional group-containing monomer include hydroxy group-containing vinyl ethers such as 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, and 6-hydroxyhexyl vinyl ether; hydroxy group-containing allyl ethers such as 2-hydroxyethyl allyl ether, 4-hydroxybutyl allyl ether, and glycerol monoallyl ether; and hydroxyalkyl esters of (meth)acrylic acid such as 2-hydroxyethyl acrylate (HEA) and 2-hydroxyethyl methacrylate. Preferred among these are hydroxyalkyl esters of (meth)acrylic acid, and particularly preferred is 2-hydroxyethyl acrylate (HEA). The repeating units in the structure represented by the formula (2) in $R^3$ and the polymerized units based on a curable functional group-containing monomer may be arranged in any order.

The bottle brush polymer preferably has an aspect ratio of 0.004 to 200. The aspect ratio is more preferably 0.08 to 15, still more preferably 0.2 to 5.

The aspect ratio means a value expressed by m/2n in the formula (1) and can be determined from the amounts of the monomers used for the respective polymer chains.

The bottle brush polymer preferably has a number average molecular weight determined by gel permeation chromatography (GPC) of 5000 to 2000000. The number average molecular weight is more preferably 10000 to 1000000, still more preferably 30000 to 500000.

The bottle brush polymer preferably has a molecular weight distribution determined by gel permeation chromatography (GPC) of 1.0 to 5.0. The molecular weight distribution is more preferably 1.0 to 3.0, still more preferably 1.0 to 2.5.

The molecular weight distribution means the ratio $M_w/M_n$ of the weight average molecular weight ($M_w$) to the number average molecular weight (Ma).

The bottle brush polymer preferably contains halogen atoms in a total amount of 0.01 to 30% by mass. The total amount of halogen atoms is more preferably 0.02 to 15% by mass, still more preferably 0.05 to 5% by mass.

Examples of the halogen atoms include bromine atoms, chlorine atoms, and iodine atoms.

The total amount of halogen atoms is preferably the total amount of halogen atoms that are bonded to (are not released from) the molecular chain of the bottle brush polymer.

The total amount of the halogen atoms can be determined by elemental analysis (combustion analysis).

The bottle brush polymer preferably contains bromine atoms, chlorine atoms, and iodine atoms in a total amount of 0.01 to 30% by mass. The total amount of bromine atoms, chlorine atoms, and iodine atoms is more preferably 0.02 to 15% by mass, still more preferably 0.05 to 5% by mass.

The total amount of bromine atoms, chlorine atoms, and iodine atoms is preferably the total amount of bromine atoms, chlorine atoms, and iodine atoms that are bonded to (are not released from) the molecular chain of the bottle brush polymer.

The total amount of bromine atoms, chlorine atoms, and iodine atoms can be determined by elemental analysis (combustion analysis).

The bottle brush polymer preferably contains no fluorine atom. The bottle brush polymer may have excellent water- and oil-repellency even when containing no fluorine atom.

The bottle brush structure of the bottle brush polymer can be analyzed in conformity with a known method for analyzing a polymer brush structure.

Many methods are known as methods for analyzing a polymer brush structure. For example, Macromolecules, Vol. 39, 4983, 2006 and Macromolecules, Vol. 45, 9243, 2012 reported direct observation of the structure of a bottle brush polymer by AFM.

Macromolecules, Vol. 39, 4983, 2006 also reported that branched polymers can be analyzed by GPC-MALS and show different behaviors from linear polymers.

Tadashi INOUE, "Rheology of Soft Matters: Detailed Analysis with Rheo-optical Methods", Manufacturing & Technology, Association for the Advancement of Manufacturing and Technology, a general incorporated association, 2014, Vol. 66, No. 1, p. 68-70 and Tadashi INOUE, "2-3-6. Branched Polymer", Division Report 13, (online), The Chemical Society of Japan, a public interest incorporated association, (searched on Aug. 1, 2018), URL: https://division.csj.jp/div-report/13/1320306.pdf, reported that viscoelasticity analysis by a rheo-optical technique enables structural analysis and separate analysis for respective segments.

For example, the bottle brush polymer may be suitably produced by a production method including a step (1-1) of polymerizing a monomer represented by the following formula (3):

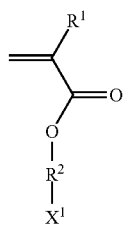

[Chem. 7]

(wherein $R^1$ and $R^2$ are defined as described for the formula (1); and $X^1$ is a halogen atom) to form a precursor polymer represented by the following formula (4):

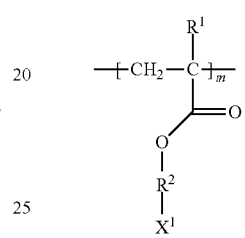

[Chem. 8]

(wherein $R^1$, $R^2$, and m are defined as described for the formula (1); and $X^1$ is defined as described for the formula (3)), and a step (1-2) of polymerizing, starting from $X^1$ of the precursor polymer, a monomer represented by the following formula (5):

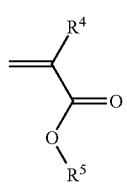

[Chem. 9]

(wherein $R^4$ and $R^5$ are defined as described for the formula (2)) to provide a bottle brush polymer having a structure represented by the formula (1).

In the formula (3), $X^1$ is a halogen atom. Examples of the halogen atom include a bromine atom, a chlorine atom, and an iodine atom. Preferred among these is a bromine atom.

The polymerization in the step (1-1) may be performed by a known polymerization technique such as radical polymerization or living radical polymerization.

The polymerization conditions used may be conditions commonly used for polymerization of a (meth)acrylate monomer.

The polymerization in the step (1-2) may be performed using an atom transfer radical polymerization initiator system, for example.

The atom transfer radical polymerization initiator system is preferably such that a precursor polymer represented by the formula (4), a transition metal complex (a-1) of the 8 group in the short-period periodic table, and optionally an amine (a-2) form a composite polymerization initiator.

The component (a-1) is a transition metal complex whose central metal is an 8 group element in the short-period periodic table. One of such transition metal complexes may be used alone or two or more of these may be used in combination.

Examples of the 8 group element in the short-period periodic table for the central metal include Fe, Co, Ni, Ru, Rh, Pd, and Pt. Preferred among these are Fe and Ru, and particularly preferred is Ru.

Examples of a ligand which coordinates as a monodentate or multidentate ligand to such a central metal to form a complex include, but are not limited to, linear hydrocarbon ligands, including olefins such as ethylene, 2-butene, allyl, and 2-methylallyl, and allenes; hydrocarbon-ring-containing hydrocarbon ligands such as cyclopentadienyl, pentamethylcyclopentadienyl, indenyl, fluorenyl, cyclooctadiene, and norbornadiene; phosphorus-atom-containing ligands, including triaryl phosphines such as triphenyl phosphine and trinaphthyl phosphine, trialkyl phosphines such as tri-n-butyl phosphine, and triaryl phosphites such as triphenyl phosphite; nitrogen-atom-containing ligands such as nitrogen, bipyridine, and phenanthroline; sulfur-atom-containing ligands such as dithiocarbamate and dithiolene; oxygen-atom-containing ligands such as acetyl acetonate and carbon monooxide; halogen atoms such as chlorine, bromine, and iodine; pseudohalogen groups such as CN, SCN, OCN, ONC, and N3; and a hydrogen atom.

The transition metal complex (a-1) is preferably represented by the following formula (11):

$$ML^1_i L^2_j \qquad (11)$$

wherein M is an 8 group transition metal element in the short-period periodic table; $L^1$s are each a hydrocarbon-ring-containing hydrocarbon ligand optionally containing a substituent; $L^2$s may be the same as or different from each other and are each a ligand that coordinates to a metal to form a complex; i is an integer of 0 to 2; and j is an integer of 0 to 5.

In the formula (11), the 8 group transition metal element in the short-period periodic table represented by M is defined as described above. The ligand represented by $L^1$ may be any hydrocarbon-ring-containing hydrocarbon ligand that can coordinate or bind as a monodentate or multidentate ligand to the metal complex, with the hydrocarbon ligand optionally containing a substituent. Examples thereof include benzene, cyclobutadiene, cyclopentadienyl, cyclohexadiene, cycloheptadiene, cycloheptatriene, cycloheptatrienyl, cyclooctadiene, cyclooctatetraene, and norbornadiene. Particularly preferred is a hydrocarbon ring containing a five-membered ring, such as cyclopentadienyl, indenyl, or fluorenyl.

These hydrocarbon ligands may contain any of various substituents such as alkyl, alkenyl, alkynyl, alkoxy, alkoxycarbonyl, acyl, acyloxy, carboxy, hydroxy, amino, amide, imino, nitro, cyano, silyl, thioester, thioketone, and thioether groups, and halogen atoms such as chlorine, bromine, and iodine. Examples of hydrocarbon ligands containing a substituent include pentamethyl cyclopentadienyl and trimethylsilyl cyclopentadienyl.

The ligand represented by $L^2$ may be any ligand that coordinates as a monodentate or multidentate ligand to the central metal to form a complex, and is defined as described above, except for the hydrocarbon-ring-containing hydrocarbon ligands. Specific examples of $L^2$ include a hydrogen atom and halogen atoms such as a chlorine atom, a bromine atom, and an iodine atom. These ligands may be the same as or different from each other.

In the formula, i is an integer of 0 to 2, preferably an integer of 1 or 2, more preferably 1. In the formula, j is an integer of 0 to 5, preferably an integer of 2 to 5, more preferably an integer of 3 to 5.

Specific examples of the transition metal complex (a-1) include chlorocyclopentadienylbis(triphenylphosphine) ruthenium, chloropentamethylcyclopentadienylbis(triphenylphosphine) ruthenium, chloroindenylbis(triphenylphosphine) ruthenium, chloropentamethylcyclopentadienyltricyclohexylphosphine ruthenium, dichlorotris(triphenylphosphine) ruthenium, dichlorotris(tributylphosphine) ruthenium, dihydridotetrakis(triphenylphosphine) ruthenium, iododicarbonylcyclopentadienyl iron, and dibromobis(triphenylphosphine) iron. Preferred among these are chlorocyclopentadienylbis(triphenylphosphine) ruthenium, chloropentamethylcyclopentadienylbis(triphenylphosphine) ruthenium, and chloroindenylbis(triphenylphosphine) ruthenium.

The amine (a-2) is used as an activator that acts on the component (a-1) to promote radical polymerization. One of such amines may be used or two or more of these may be used in combination.

Examples of the amine (a-2) include aliphatic primary amines such as methylamine, ethylamine, propylamine, isopropylamine, and butylamine, aliphatic secondary amines such as dimethylamine, diethylamine, dipropylamine, diisopropylamine, and dibutylamine, aliphatic tertiary amines such as trimethylamine, triethylamine, tripropylamine, triisopropylamine, and tributylamine, aliphatic polyamines such as N,N,N',N'-tetramethylethylenediamine, N,N,N',N'',N''-pentamethyldiethylenetriamine, and 1,1,4,7,10,10-hexamethyltriethylenetetraamine, aromatic primary amines such as aniline and toluidine, aromatic secondary amines such as diphenylamine, and aromatic tertiary amines such as triphenylamine. Preferred among these are aliphatic amines.

The composite polymerization initiator preferably has a ratio (by mole) of the component (a-1) to a precursor polymer represented by the formula (4), i.e., (a-1)/precursor polymer, of 0.01 to 10, more preferably 0.05 to 5. A composite polymerization initiator having an (a-1)/precursor polymer ratio within this range enables production of a polymer having a narrow molecular weight distribution at a high polymerization speed.

The component (a-1) and the component (a-2) preferably give a ratio (a-1)/(a-2) (by mole) of 0.01 to 10, more preferably 0.05 to 5. Components giving a ratio (a-1)/(a-2) within this range enables production of a polymer having a narrow molecular weight distribution at a high polymerization speed.

The atom transfer radical polymerization initiator system in the step (1-1) and the step (1-2) may include use of a copper complex.

The copper complex is preferably a monovalent copper complex or a divalent copper complex. Specific examples thereof include copper(II) bromide, copper(I) bromide, copper(I) chloride, copper(II) chloride, copper(I) iodide, and copper(II) iodide. In the case of using any of these copper complexes, an amine ligand is added to increase the catalytic activity.

The amine ligand is preferably a multidentate amine because of its high catalytic activity. Examples of the multidentate amine used as a ligand include, but are not limited to, bidentate multidentate amines such as 2,2-bipyridine; tridentate multidentate amines such as N,N,N',N'',N''-pentamethyldiethylenetriamine; tetradentate multidentate amines such as tris[(2-dimethylamino)ethyl]amine (often abbreviated to Me6TREN) and tris(2-picolyl)amine; hexadentate multidentate amines such as N,N,N',N'-tetrakis(2-pyridylmethyl)ethylenediamine; and polyamines such as polyethyleneimine.

Macromolecules, 2006, 39, 39 reported activators regenerated by electron transfer (ARGET); Specifically, in atom transfer radical polymerization, a reducing agent is used to reduce highly oxidized transition metal complexes, which cause delay or stop of the polymerization, thereby enabling rapid progress of the polymerization reaction to a high reaction percentage even under low concentration catalyst conditions with a small amount of transition metal complexes.

Examples of the reducing agent used for ARGET include, but are not limited to, organic acid compounds such as citric acid, oxalic acid, ascorbic acid, ascorbic acid salts, and ascorbic acid esters, as well as metals, metal hydrides, nitrogen-hydrogen compounds such as hydrazine and diimide, and azo compounds such as azobisisobutyronitrile. A solid reducing agent may be added as it is or may be dissolved in a solvent before addition. One of these reducing agents may be used alone or two or more of these may be used in combination. A reducing agent may be added to the reaction system directly or may be generated in the reaction system. The latter case includes electrolytic reduction. Electrons generated at the negative electrode in the electrolytic reduction are known to exhibit a reducing action immediately after the generation or after solvation in a solvent. In other words, a reducing agent generated by electrolysis may also be used.

The polymerization may be performed by any technique, such as bulk polymerization, solution polymerization, suspension polymerization, emulsion polymerization, or bulk-suspension polymerization.

In the case of solution polymerization, examples of a solvent used include aromatic hydrocarbons such as benzene, toluene, ethylbenzene, and xylene, alicyclic hydrocarbons such as cyclohexane, aliphatic hydrocarbons such as hexane and octane, ketones such as acetone, methyl ethyl ketone, and cyclohexanone, ethers such as dioxanes, e.g., 1,4-dioxane, and tetrahydrofuran, esters such as ethyl acetate, amides such as N,N-dimethylformamide, sulfoxides such as dimethyl sulfoxide, and alcohols such as methanol and ethanol. Particularly preferred are toluene, ethylbenzene, benzene, N,N-dimethylformamide, 1,4-dioxane, and tetrahydrofuran. One of these solvents may be used or two or more of these may be used in the form of a mixture.

The polymerization may be performed under normal pressure or under an increased pressure. The polymerization temperature may be selected from a wide range of about 0° C. to 200° C., preferably 50° C. to 200° C., more preferably 60° C. to 160° C., still more preferably 80° C. to 140° C., in accordance with factors such as the type of the polymerization technique, the structure of the composite polymerization initiator, and the polymerization speed. The polymerization may be performed in the atmosphere of inert gas such as nitrogen or argon, for example, in an inert gas stream. The polymerization is performed with application of a radical generator such as heat, light, or radiation.

Completion of each polymerization reaction may optionally be followed by dilution with a solvent and separation and purification by precipitation in a poor solvent or removal of monomers and volatile components such as a solvent.

The water- and oil-repellent agent of the disclosure may contain a polymer having a structure represented by the formula (2) (one that is not bonded to the molecular chain of the bottle brush polymer) in addition to the bottle brush polymer. The water- and oil-repellent agent of the disclosure may contain a polymer containing a polymerized unit based on a curable functional group-containing monomer (one that is not bonded to the molecular chain of the bottle brush polymer) in addition to the bottle brush polymer.

The water- and oil-repellent agent of the disclosure in which the bottle brush polymer contains a polymerized unit based on a curable functional group-containing monomer preferably further contains a curing agent.

The curing agent is a compound that reacts and crosslinks with a curable functional group of the bottle brush polymer, and examples of curing agents commonly used include isocyanates, amino resins, acid anhydrides, polyepoxy compounds, and isocyanate group-containing silane compounds. Preferred among these are isocyanates.

Specific examples of the isocyanates include, but are not limited to, 2,4-tolylenediisocyanate, diphenylmethane-4,4'-diisocyanate, xylylene diisocyanate, isophorone diisocyanate, lysine methyl ester diisocyanate, methyl cyclohexyl diisocyanate, trimethyl hexamethylene diisocyanate, hexamethylene diisocyanate, n-pentane-1,4-diisocyanate, trimers thereof, adducts, biurets, and isocyanurates thereof, those containing two or more isocyanate groups among these polymers, and blocked isocyanates. Preferred among these are isocyanurates.

Specific examples of the amino resins include, but are not limited to, urea resin, melamine resin, benzoguanamine resin, and glycoluril resin, as well as methylolized melamine resin in which melamine is methylolized and alkyl etherified melamine resins in which methylolized melamine is etherified with an alcohol such as methanol, ethanol, or butanol.

Specific examples of the acid anhydrides include, but are not limited to, phthalic anhydride, pyromellitic anhydride, and mellitic anhydride.

The polyepoxy compounds and isocyanate group-containing silane compounds to be used may be those disclosed in JP H02-232250 A and JP H02-232251 A. Preferred examples thereof include the following.

[Chem. 10]

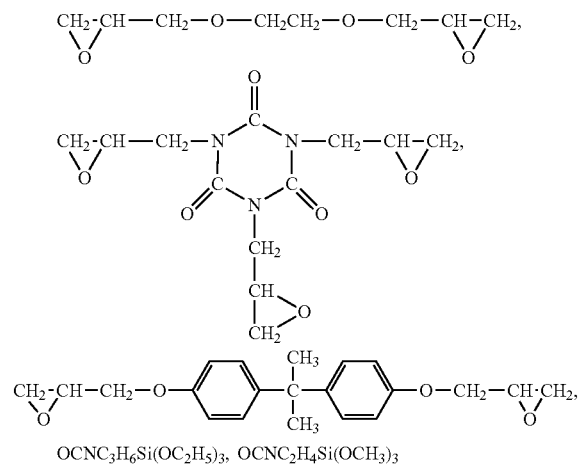

The curing agent is preferably blended in an amount of 0.1 to 5 equivalents, preferably 0.3 to 0.7 equivalents, per equivalent of the curable functional groups in the bottle brush polymer. The composition which contains a curing agent and a bottle brush polymer containing a polymerized unit based on a curable functional group-containing monomer can be cured commonly within several minutes to about 10 days at 0° C. to 200° C.

The water- and oil-repellent agent of the disclosure preferably has a static contact angle to water, which is measured by the method to be described later, of 100 degrees or greater, more preferably 102 degrees or greater. The upper limit thereof may be, but is not limited to, 115 degrees or smaller.

The water- and oil-repellent agent of the disclosure preferably has a static contact angle to diiodomethane, which is measured by the method to be described later, of 55 degrees or greater, more preferably 56 degrees or greater. The upper limit thereof may be, but is not limited to, 65 degrees or smaller.

The water- and oil-repellent agent of the disclosure preferably has a static contact angle to n-hexadecane, which is measured by the method to be described later, of 20 degrees or greater, more preferably 23 degrees or greater. The upper limit thereof may be, but is not limited to, 55 degrees or smaller.

The static contact angles are measured by the following method (1) or (2).

(1) A solution of the bottle brush polymer at a solid concentration of 0.1% in chloroform is applied to a PET substrate by spin coating to form a film and 2 μL of water or diiodomethane is then dropped on the film. The contact angle after 30 seconds from the drop adhesion is measured.

(2) A solution of the bottle brush polymer at a solid concentration of 1.0% in chloroform is applied to a PET substrate by spin coating to form a film and 2 μL of water or hexadecane is then dropped on the film. The contact angle after one second from the drop adhesion is measured.

For the static contact angle to water, at least one selected from the values measured by the methods (1) and (2) is preferably within the above range, more preferably both of the values measured by the methods (1) and (2) are within the above range.

The water- and oil-repellent agent of the disclosure preferably has a sliding angle of water, which is measured by the method to be described later, of 20 degrees or smaller, more preferably 17 degrees or smaller. The sliding angle of water may be 4 degrees or greater.

The water- and oil-repellent agent of the disclosure preferably has a sliding angle of n-hexadecane, which is measured by the method to be described later, of 15 degrees or smaller, more preferably 12 degrees or smaller. The sliding angle of n-hexadecane may be 4 degrees or greater.

The sliding angle is measured by the following method.

A solution of the bottle brush polymer at a solid concentration of 1.0% in chloroform is applied to a PET substrate by spin coating to form a film and 20 μL of water or 5 μL of n-hexadecane is then dropped on the film. The substrate is tilted at a rate of 2°/sec, and the angle at which the droplet starts to slide is measured as the sliding angle.

The water- and oil-repellent agent of the disclosure is a water- and oil-repellent agent for fibers. Treating the surface of fibers with the water- and oil-repellent agent of the disclosure can give excellent water- and oil-repellency to the fibers.

Examples of fibers to be treated with the water- and oil-repellent agent of the disclosure include animal- or plant-based natural fibers such as cotton, hemp, wool, and silk; synthetic fibers such as polyamide, polyester, polyvinyl alcohol, polyacrylonitrile, polyvinyl chloride, and polypropylene; semi-synthetic fibers such as rayon and acetate; chemical fibers such as viscose rayon and lyocell; inorganic fibers such as glass fibers, carbon fibers, and asbestos fibers; fiber mixtures of any of these; and woven fabric, knit fabric, and nonwoven fabric of any of these fibers. Preferred among these are animal- or plant-based natural fibers, synthetic fibers, semi-synthetic fibers, and woven fabric, knit fabric, and nonwoven fabric of any of these.

The fibers may be in the form of clothing fabric or carpet.

The water- and oil-repellent agent of the disclosure is preferably used for textile for clothing and accessories or interior design.

Treatment of fibers with the water- and oil-repellent agent of the disclosure may be performed by any method, such as a method of attaching a solution or dispersion of the water- and oil-repellent agent in a solvent to the surface of fibers by a known coating technique, e.g., immersion coating, and then drying and heating the film.

The solvent may be any solvent that can dissolve or disperse the water- and oil-repellent agent, and is preferably an organic solvent. Examples thereof include non-aromatic hydrocarbon solvents such as pentane, hexane, heptane, octane, cyclohexane, decahydronaphthalene, n-decane, isododecane, and tridecane; aromatic hydrocarbon solvents such as benzene, toluene, xylene, tetralin, veratrole, diethylbenzene, methylnaphthalene, nitrobenzene, o-nitrotoluene, mesitylene, indene, and diphenyl sulfide; ketone solvents such as acetone, methyl ethyl ketone, methyl isobutyl ketone, acetophenone, propiophenone, diisobutyl ketone, and isophorone; halogenated hydrocarbon solvents such as dichloromethane, chloroform, and chlorobenzene; ether solvents such as diethyl ether, tetrahydrofuran, diisopropyl ether, methyl t-butyl ether, dioxane, dimethoxyethane, diglyme, phenetole, 1,1-dimethoxycyclohexane, and diisoamyl ether; alcohol solvents such as methanol, ethanol, propanol, butanol, t-butanol, pentanol, and isopropanol; ester solvents such as ethyl acetate, isopropyl acetate, butyl acetate, diethyl malonate, 3-methoxy-3-methyl butyl acetate, γ-butyrolactone, ethylene carbonate, propylene carbonate, ethyl methyl carbonate, dimethyl carbonate, diethyl carbonate, and α-acetyl-γ-butyrolactone; nitrile solvents such as acetonitrile and benzonitrile; sulfoxide solvents such as dimethyl sulfoxide and sulfolane; and amide solvents such as N,N-dimethylformamide, N,N-dimethylacetamide, N-methylpyrrolidone, 1,3-dimethyl-2-imidazolidinone, N,N-dimethylacrylamide, N,N-dimethylacetoacetamide, N,N-diethylformamide, and N,N-diethylacetamide.

The solvent is also preferably water.

The treatment of fibers may include combination use of any of other agents such as a different water-repellent agent or oil-repellent agent, as well as a softening agent, an antibacterial agent, a cross-linking agent, an insecticide, a flame retarder, an antistatic agent, a dye stabilizer, and a wrinkle-resistant agent.

The disclosure also relates to a fiber product including fibers coated with the aforementioned water- and oil-repellent agent of the disclosure. The fiber product of the disclosure includes fibers coated with the water- and oil-repellent agent of the disclosure, and thus has excellent water- and oil-repellency.

Examples of fibers to be used for the fiber product of the disclosure include the aforementioned fibers to be treated with the water- and oil-repellent agent of the disclosure. The fiber product of the disclosure may be in the form of woven fabric, knit fabric, or nonwoven fabric of the fibers, for example, although not limited thereto. The fiber product of the disclosure may be produced by treating material fibers with the water- and oil-repellent agent of the disclosure and processing the treated fibers into a desired form such as woven fabric, or may be produced by processing material fibers into a desired form and then treating the processed fibers with the water- and oil-repellent agent of the disclosure.

The fiber product of the disclosure is preferably textile for clothing and accessories or for interior design.

EXAMPLES

The disclosure is described in detail below with reference to examples, but the disclosure is not intended to be limited by these examples.

Synthesis Example 1 (Synthesis of Backbone Polymer (PBIEMA))

A reaction container purged with argon was charged with 34.4 mL of toluene, 5.58 g of 2-(2-bromoisobutyryloxy) ethyl methacrylate (BIEMA), and 32.8 mg of 2,2'-azobis (isobutyronitrile). The contents were reacted at 60° C. for 24 hours, whereby a backbone polymer PBIEMA was obtained. GPC measurement with chloroform used as an eluent showed that the polymer had a number average molecular weight ($M_n$) of 32000 and a molecular weight distribution (PDI) of 2.15.

Synthesis Example 2 (Polymer (1): StMA Bottle Brush, Charged PBIEMA:StMA=1:30)

A reaction container purged with argon was charged with 185 mL of toluene, 43.1 mg of chloro(indenyl)bis(triphenylphosphine) ruthenium(II) ($CH_2Cl_2$) ($Ru(Ind)Cl(PPh_3)_2 \cdot CH_2Cl_2$), 1.92 mL of n-tributylamine (520 mM toluene solution), 10.2 g of stearyl methacrylate (StMA), 279 mg of PBIEMA obtained in Synthesis Example 1, and 0.5 mL of 1,4-dioxane. The contents were reacted at 80° C. for 168 hours. The reaction product was sampled and the polymerization percentage was calculated to be 73%. The polymerization solution was added dropwise to a large amount of methanol so that the solid was precipitated and purified. Thereby, a polymer was obtained. GPC measurement with chloroform used as an eluent showed bimodal peaks with the two peaks having a $M_n$ value of 132000 and a PDI value of 1.24 and a $M_n$ value of 14000 and a PDI value of 1.33, respectively. Elemental analysis on the polymer detected 0.24% by weight of bromine atoms.

Synthesis Example 3 (Polymer (2): StMA Bottle Brush, Charged PBIEMA:StMA=1:80)

A reaction container purged with argon was charged with 166 mL of toluene, 43.1 mg of $Ru(Ind)Cl(PPh_3)_2 \cdot CH_2Cl_2$, 1.92 mL of n-tributylamine (520 mM toluene solution), 27.1 g of stearyl methacrylate (StMA), 279 mg of PBIEMA obtained in Synthesis Example 1, and 0.5 mL of 1,4-dioxane. The contents were reacted at 80° C. for 30 hours. The reaction product was sampled and the polymerization percentage was calculated to be 83%. The polymerization solution was added dropwise to a large amount of methanol so that the solid was precipitated and purified. Thereby, a polymer was obtained. GPC measurement with chloroform used as an eluent showed bimodal peaks with the two peaks having a $M_n$ value of 224000 and a PDI value of 1.59 and a $M_n$ value of 23000 and a PDI value of 1.29, respectively. Elemental analysis on the polymer detected 0.15% by weight of bromine atoms.

Synthesis Example 4 (Polymer (3): StA Bottle Brush, Charged PBIEMA:StA=1:30)

A reaction container purged with argon was charged with 17.5 mL of toluene, 17.2 mg of $Ru(Ind)Cl(PPh_3)_2$, 0.43 mL of n-tributylamine (470 mM toluene solution), 1.95 g of stearyl acrylate (StA), and 55.8 mg of PBIEMA obtained in Synthesis Example 1. The contents were reacted at 80° C. for 312 hours. The reaction product was sampled and the polymerization percentage was calculated to be 83%. The polymerization solution was added dropwise to a large amount of methanol so that the solid was precipitated and purified. Thereby, a polymer was obtained. GPC measurement with chloroform used as an eluent showed bimodal peaks with the two peaks having a $M_n$ value of 98000 and a PDI value of 2.05 and a $M_n$ value of 6000 and a PDI value of 1.39, respectively. Elemental analysis on the polymer detected 0.46% by weight of bromine atoms.

Synthesis Example 5 (Polymer (4): StA Bottle Brush, Charged PBIEMA:StA=1:80)

A reaction container purged with argon was charged with 14.1 mL of toluene, 17.2 mg of $Ru(Ind)Cl(PPh_3)_2$, 0.43 mL of n-tributylamine (470 mM toluene solution), 5.19 g of stearyl acrylate (StA), and 55.8 mg of PBIEMA obtained in Synthesis Example 1. The contents were reacted at 80° C. for 150 hours. The reaction product was sampled and the polymerization percentage was calculated to be 83%. The polymerization solution was added dropwise to a large amount of methanol so that the solid was precipitated and purified. Thereby, a polymer was obtained. GPC measurement with chloroform used as an eluent showed bimodal peaks with the two peaks having a $M_n$ value of 307000 and a PDI value of 1.98 and a $M_n$ value of 13000 and a PDI value of 1.49, respectively. Elemental analysis on the polymer detected 0.19% by weight of bromine atoms.

Synthesis Example 6 (Polymer (5): TdMA Bottle Brush)

A reaction container purged with argon was charged with 17.4 mL of toluene, 4.31 mg of $Ru(Ind)Cl(PPh_3)_2 \cdot CH_2Cl_2$, 0.23 mL of n-tributylamine (430 mM toluene solution), 2.26 g of tetradecyl methacrylate (TdMA), 27.9 mg of PBIEMA obtained in Synthesis Example 1, and 0.05 mL of 1,4-dioxane. The contents were reacted at 80° C. for 30 hours. The reaction product was sampled and the polymerization percentage was calculated to be 76%. The polymerization solution was added dropwise to a large amount of methanol so that the solid was precipitated and purified. Thereby, a polymer was obtained. GPC measurement with chloroform used as an eluent showed bimodal peaks with the two peaks having a $M_n$ value of 215000 and a PDI value of 1.68 and a $M_n$ value of 21000 and a PDI value of 1.29, respectively.

Synthesis Example 7 (Polymer (6): StMA Linear Polymer, 100 Mer Charged)

A reaction container purged with argon was charged with 24.4 mL of toluene, 60.3 mg of $Ru(Ind)Cl(PPh_3)_2 \cdot CH_2Cl_2$, 1.43 mL of n-tributylamine (490 mM toluene solution), 35.5 g of stearyl methacrylate (StMA), 2.02 mL of methyl 2-chloro-2-phenylacetate (MCPA) (520 mM toluene solution), and 1 mL of 1,4-dioxane. The contents were reacted at 80° C. for 35.5 hours. The reaction product was sampled and the polymerization percentage was calculated to be 88%.

The polymerization solution was added dropwise to a large amount of methanol so that the solid was precipitated and purified. Thereby, a polymer was obtained. GPC measurement with tetrahydrofuran (THF) used as an eluent showed a $M_n$ value of 30000 and a PDI value of 1.37.

Synthesis Example 8 (Polymer (7): StMA Linear Polymer, 30 Mer Charged)

A reaction container purged with argon was charged with 18.4 mL of toluene, 4.31 mg of Ru(Ind)Cl(PPh$_3$)$_2$·CH$_2$Cl$_2$, 0.19 mL of n-tributylamine (520 mM toluene solution), 1.02 g of stearyl methacrylate (StMA), 0.18 mL of methyl 2-bromoisobutyrate (MBIB) (550 mM toluene solution), and 0.05 mL of 1,4-dioxane. The contents were reacted at 80° C. for 72 hours. The reaction product was sampled and the polymerization percentage was calculated to be 74%. The polymerization solution was added dropwise to a large amount of methanol so that the solid was precipitated and purified. Thereby, a polymer was obtained. GPC measurement with chloroform used as an eluent showed a $M_n$ value of 9100 and a PDI value of 1.17.

Synthesis Example 9 (Polymer (8): StMA Linear Polymer, 80 Mer Charged)

A reaction container purged with argon was charged with 16.4 mL of toluene, 4.31 mg of Ru(Ind)Cl(PPh$_3$)$_2$·CH$_2$Cl$_2$, 0.19 mL of n-tributylamine (520 mM toluene solution), 2.71 g of stearyl methacrylate (StMA), 0.18 mL of methyl 2-bromoisobutyrate (MBIB) (550 mM toluene solution), and 0.05 mL of 1,4-dioxane. The contents were reacted at 80° C. for 28 hours. The reaction product was sampled and the polymerization percentage was calculated to be 83%. The polymerization solution was added dropwise to a large amount of methanol so that the solid was precipitated and purified. Thereby, a polymer was obtained. GPC measurement with chloroform used as an eluent showed a $M_n$ value of 18000 and a PDI value of 1.17.

Synthesis Example 10 (Polymer (9): StA/HEA Bottle Brush, Charged PBIEMA:StA:HEA=1:76:4)

A reaction container purged with argon was charged with 14.5 mL of toluene, 17.2 mg of Ru(Ind)Cl(PPh$_3$)2, 0.43 mL of n-tributylamine (470 mM toluene solution), 4.93 g of stearyl acrylate (StA), 92.8 mg of 2-hydroxyethyl acrylate (HEA), and 55.8 mg of PBIEMA obtained in Synthesis Example 1. The contents were reacted at 80° C. for 72 hours. The reaction product was sampled and the polymerization percentage was calculated to be 80%. The polymerization solution was added dropwise to a large amount of methanol so that the solid was precipitated and purified. Thereby, a polymer was obtained. GPC measurement with chloroform used as an eluent showed bimodal peaks with the two peaks having a $M_n$ value of 360000 and a PDI value of 1.85 and a $M_n$ value of 12000 and a PDI value of 1.76, respectively. Elemental analysis on the polymer detected 0.21% by weight of bromine atoms.

<Contact Angle Measurement>

A solution of each of the polymers (1), (2), (7), and (8) obtained in the synthesis examples at a solid concentration of 0.1% in chloroform was applied to a PET substrate by spin coating to form a film and 2 μL of water or diiodomethane was then dropped on the film. The contact angle after 30 seconds from the drop adhesion was measured. The results are shown in Table 1.

TABLE 1

| Polymer | (1) | (2) | (7) | (8) | PET substrate |
|---|---|---|---|---|---|
| Contact angle to water (°) | 102.4 | 106.3 | 99.1 | 101.1 | 72.7 |
| Contact angle to diiodomethane (°) | 57.6 | 56.4 | 46.3 | 52.1 | 25.7 |

A solution of each of the polymers (1) to (6) and (9) obtained in the synthesis examples at a solid concentration of 1.0% in chloroform and a solution prepared by mixing a solution of the polymer (9) at a solid concentration of 1.0% in chloroform with Sumidur N-3300 (available from Sumika Covestro Urethane Co., Ltd.) in an amount of 0.3 equivalents relative to the HEA units were each applied to a PET substrate by spin coating to form a film and 2 μL of water or n-hexadecane was then dropped on the film. The contact angle after one second from the drop adhesion was measured. The results are shown in Table 2. The value "<10" indicates that the droplet made the film wet and spread thereon and that the contact angle is smaller than 10°.

TABLE 2

| Polymer | (1) | (2) | (3) | (4) | (5) | (6) | (9) | (9) + N3300 | PET substrate |
|---|---|---|---|---|---|---|---|---|---|
| Contact angle to water (°) | 102.4 | 103.1 | 110.6 | 110.1 | 109.6 | 108.9 | 110.1 | 109.9 | 72.7 |
| Contact angle to n-hexadecane (°) | 23.4 | 28.5 | 40.7 | 41.9 | 34.6 | 37.2 | 42.4 | 42.1 | <10 |

<Sliding Angle Measurement>

A solution of each of the polymers (1) to (6) and (9) at a solid concentration of 1.0% in chloroform and a solution prepared by mixing a solution of the polymer (9) at a solid concentration of 1.0% in chloroform with Sumidur N-3300 in an amount of 0.3 equivalents relative to the HEA units were each applied to a PET substrate by spin coating to form a film and 20 μL of water or 5 μL of n-hexadecane was then dropped on the film. The substrate was tilted at a rate of 2°/sec, and the angle at which the droplet started to slide was measured as the sliding angle. The results are shown in Table 3. The value ">85" indicates that the droplet did not slide even when the substrate was tilted to 85°.

TABLE 3

| Polymer | (1) | (2) | (3) | (4) | (5) | (6) | (9) | (9) + N3300 |
|---|---|---|---|---|---|---|---|---|
| Sliding angle of water (°) | 15.7 | 7.3 | 9.3 | 8.3 | >85 | 15.0 | 8.7 | 9.3 |
| Sliding angle of n-hexadecane (°) | 6.3 | 12.0 | 11.7 | 10.7 | 34.5 | 8.0 | 9.0 | 8.3 |

<Water-Repellency Test>

A solution of each of the polymers (1) to (6) and (9) obtained in the synthesis examples at a solid concentration of 1.5% in toluene and a solution prepared by mixing a solution of the polymer (9) at a solid concentration of 1.5% in toluene with Sumidur N-3300 in an amount of 0.3 equivalents relative to the HEA units were each used as a treatment bath. A nylon cloth was immersed in each test solution and then passed through a mangle so that the test cloth was heated at 170° C. for three minutes. The water-repellency of this cloth was evaluated. The water-repellency of the treated cloth was evaluated by the spray method in conformity with JIS L 1092 (AATCC-22). The water-repellency was expressed by the water-repellency No. shown in Table 4. The higher the score is, the better the water-repellency is. The results are shown in Table 5.

TABLE 4

| Water-repellency No. | Condition |
|---|---|
| 100 | Neither wetting nor adhesion of waterdrops was observed on the front surface |
| 90 | No wetting was observed but adhesion of small waterdops was observed on the front surface |
| 80 | Wetting with small and discrete waterdrops was observed on the front surface |
| 70 | Wetting was observed on half of the front surface and small and discrete wetting portions permeated into the cloth |
| 50 | Wetting was observed on the entire front surface |
| 0 | Wetting was observed on the entire front and back surfaces |

|  | Example 1 | Example 2 | Example 3 | Example 4 | Example 5 | Example 6 | Comparative Example 1 | Comparative Example 2 |
|---|---|---|---|---|---|---|---|---|
| Treated polymer | (1) | (2) | (3) | (4) | (9) | (9) + N3300 | (5) | (6) |
| Water-repellency No. | 100 | 90 | 90 | 90 | 90 | 100 | 50 | 80 |

The invention claimed is:

1. A water- and oil-repellent agent for fibers, comprising: a bottle brush polymer having a structure represented by the following formula (1):

$$\underset{}{+\mathrm{CH}_2-\underset{\underset{\underset{R^3}{|}}{\underset{R^2}{|}}{\underset{O}{|}}}{\overset{R^1}{\underset{|}{C}}}\xrightarrow{}_m}=O, \quad (1)$$

wherein
R$^1$ is H or CH$_3$;
R$^2$ is a divalent organic group;
R$^3$ is a polymer chain having a structure represented by the following formula (2):

$$\underset{}{+\mathrm{CH}_2-\underset{\underset{R^5}{\underset{|}{O}}}{\underset{|}{\overset{R^4}{\underset{|}{C}}}}\xrightarrow{}_n}=O, \quad (2)$$

wherein R$^4$ is H or CH$_3$; R$^5$ is a C16-C40 monovalent hydrocarbon group; and n is an integer of 10 to 1000;
m is an integer of 10 to 5000; and
wherein the bottle brush polymer contains bromine atoms, chlorine atoms, and iodine atoms in a total amount of 0.01 to 30% by mass.

2. The water- and oil-repellent agent for fibers according to claim 1,
wherein the bottle brush polymer has a number average molecular weight determined by gel permeation chromatography (GPC) of 5000 to 2000000.

3. The water- and oil-repellent agent for fibers according to claim 1,
wherein the bottle brush polymer has a molecular weight distribution determined by gel permeation chromatography (GPC) of 1.0 to 5.0.

4. The water- and oil-repellent agent for fibers according to claim 1,
wherein the bottle brush polymer contains halogen atoms in a total amount of 0.01 to 30% by mass.

5. The water- and oil-repellent agent for fibers according claim 1,
wherein R$^5$ is a C16-C24 monovalent hydrocarbon group.

6. The water- and oil-repellent agent for fibers according to claim 1,
wherein R$^2$ is a group represented by the following formula (a):

—(CH$_2$)$_p$—O—C(=O)—R$^6$— (a)

wherein R$^6$ is a C1-C3 alkylene group; and p is an integer of 1 to 10.

7. The water- and oil-repellent agent for fibers according to claim 1,
wherein the bottle brush polymer contains no fluorine atom.

8. A fiber product comprising fibers coated with the water- and oil-repellent agent for fibers according to claim 1.

* * * * *